United States Patent [19]

Ma et al.

[11] Patent Number: 4,684,858
[45] Date of Patent: Aug. 4, 1987

[54] MOTOR PULSE EXTRACTION SYSTEM

[75] Inventors: John Ma, Milpitas; Steven Weiss, Las Gatos, both of Calif.

[73] Assignee: Capetronic (BSR) Ltd., Kowloon, Hong Kong

[21] Appl. No.: 771,667

[22] Filed: Sep. 3, 1985

[51] Int. Cl.$^4$ .............................................. H02P 5/06
[52] U.S. Cl. ................................... 318/317; 318/331; 318/439; 324/177
[58] Field of Search ............... 318/629, 317, 331, 439; 324/177; 361/23

[56] References Cited

U.S. PATENT DOCUMENTS

| 3,818,343 | 6/1974 | Galli et al. | 318/317 X |
| 3,878,446 | 4/1975 | Brandt | 318/317 |
| 4,283,665 | 8/1981 | Mizumoto | 318/331 X |
| 4,388,572 | 6/1983 | Rosenfeldt | 318/317 |

Primary Examiner—B. Dobeck
Attorney, Agent, or Firm—Stephen G. Rudisill

[57] ABSTRACT

An improved system is provided for accurately referencing the revolving motion of electric motors used as positioning devices, and is particularly applicable to the automatic positioning and repositioning of ground station antennas in the reception of satellite TV signals.

The system utilizes the action of the positioning motor itself as a reference and involves the extraction and counting of variations in the form of pulses produced in the current within the motor as a result of pulses generated, during motor operation, by the commutation process. A low impedance source senses the motor current pulses and feeds them to an active lowpass filter which suppresses any high frequency noise produced during motor commutation. Peak following circuitry, including separate positive and negative peak detectors, detects and follows the positive and negative peaks of the motor current pulses and produces a pulsating output waveform which is proportional to the number of motor current pulses detected by the peak detectors. The output pulses can be counted to provide an accurate referencing of the motor revolving motion with improved resolution and reduced susceptibility to measurement errors.

22 Claims, 8 Drawing Figures

MOTOR PULSE EXTRACTION SYSTEM

BACKGROUND OF THE INVENTION

The present invention relates generally to the automatic positioning and repositioning of satellite receiver antennas and more particularly relates to means for accurately referencing the revolving motion of electric motors used to position apparatus such as receiver antennas.

Television signals which are broadcast via satellite are received by TVRO receivers in conjunction with ground station antennas which are accurately focused onto the particular satellite of interest to the receiver. The antenna has to be repositioned whenever signals from a different satellite are to be received. A high degree of accuracy is required in the positioning and repositioning of such earth station antennas because mispositioning of the order of fractions of an inch may mean the difference between good reception and total loss of the received signals.

Almost all positioning devices use low voltage d-c motors to move the satellite antennas through a prescribed range of motion. These motors, which are typically in the fractional horsepower range of 0.05 to 0.15 hp and a d-c voltage range of 12 to 36 volts, are used to drive either linear screw actuators or wormdrive gear boxes linked to the mounting mechanisms for the earth station antennas.

Conventional methods for the measurement of antenna position generally use position sensors or transducers, such as "Hall effect" or "Reed" switches actually located on the mounting mechanism of the antenna. Such sensors, along with the necessary wiring for them, constitute a significant cost addition factor for the overall system, which can be critical, especially in the highly competitive market of TVRO receivers and related earth station antenna accessories.

Further, these methods are subject to limits in their positional accuracy, and the sensors and related circuits are generally limited to use with a particular motor and may require readjustments or even replacement prior to use with different positioning motors.

SUMMARY OF THE INVENTION

It is a primary object of the present invention to provide improved means for accurate position measurement during the positioning and repositioning of earth station antennas.

It is a related object of this invention to provide a means for the accurate measurement of the rotational motion of electric motors used for positioning apparatus such as earth station antennas.

Another object of the present invention is to provide such an improved means which does not require an externally mounted position sensor and the related external wiring.

A further object of this invention is to provide an improved position measuring means which is applicable without readjustment to a wide range of motors operating at widely differing speeds.

According to the system of this invention, the motor used to position the earth station antenna is itself used as the sensing device. The fractional-horsepower motors used for antenna positioning are small and have commutators with a small number of segments (usually an odd number from 3 to 7). As is well known from the theory of commutation, as the commutator segments to which the terminals of the individual winding elements of the motor are connected pass under the motor brushes, the elements are successively switched from a path or circuit in which the current has one direction to an adjoining circuit in which the current will have opposite direction.

During this transition period, which is generally called the period of commutation, the commutator segment under the motor brush is short circuited to the adjoining commutator segment, thereby causing a sharp reduction in the back e.m.f., which in turn produces a significant pulse in the supply current.

Because the commutators of the motors used for antennas have a small number of segments, a substantial amount of armature current ripple is also produced. This current ripple is made up of variations in the back e.m.f. waveform and the current spike as described above. The variations in the back e.m.f. manifest themselves in the form of electrical pulses which, for an odd number of commutator segments, occur at a frequency which is twice the product of the number of revolutions per second of the motor shaft and the number of commutator segments. If these pulses can be extracted and counted, they provide an accurate measurement of motor revolution.

The illustrative embodiment provides a system for extracting these commutation pulses so that they may be conveniently counted and constitutes a means for accurately determining the extent of motor rotational motion and hence the actual position of the antenna with respect to the mounting mechanism.

BRIEF DESCRIPTION OF THE DRAWINGS

The invention and other objects and advantages thereof, may best be understood by referring to the following description along with the accompanying drawings in which.

DESCRIPTION OF THE PREFERRED EMBODIMENT

While the invention will be described in connection with certain preferred embodiments, it will be understood that it is not intended to limit the invention to those particular embodiments. On the contrary, it is intended to cover all alternatives, modifications and equivalent arrangements as may be included within the spirit and scope of the invention as defined by the appended claims.

Figure 1:
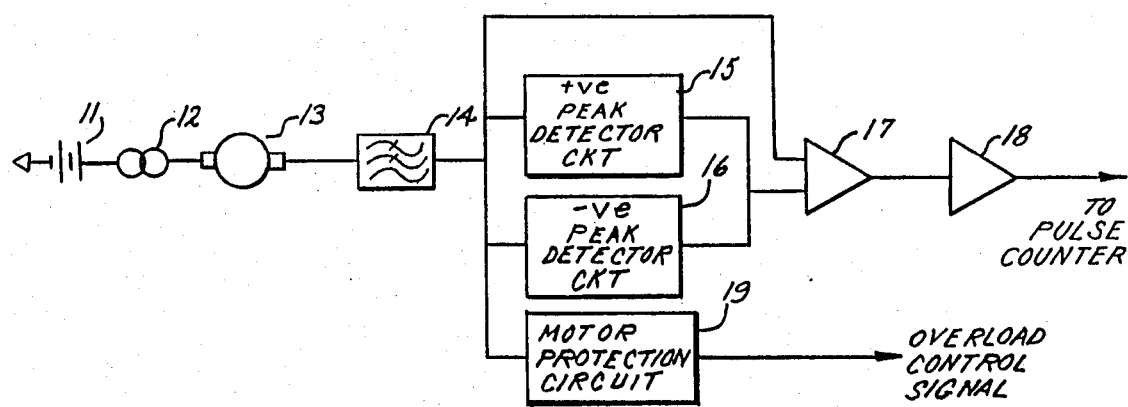
FIG. 1 is a block diagram of a motor pulse extraction system according to the system of the present invention.

Referring now to the drawings and specifically to FIG. 1, there is shown in block diagram form, a motor pulse extraction system according to the system of this invention.

As shown, the system 10 includes a fixed d-c voltage source 11 supplied through current limiting means 12 to an electric motor 13 whose rotational motion has to be measured or referenced in some way. The current within the motor is sensed by appropriate resistive means and then passed through an active low pass filter 14. The sensed signal fed to the filter 14 contains the desired information such as the current variations that depend on the back e.m.f. and the commutation pulses. In addition, the motor current contains a large amount of undesirable noise generated by the sparking at the brushes which, as explained above, is caused by the occurrence of non-optimal commutation conditions. Most of this undesirable noise is at a high frequency and the lowpass filter 14 functions to eliminate the noise while allowing only the current pulse variations of interest through.

The filtered signal from the filter 14 is applied to a pulse tracking section consisting of a positive peak detector circuit 15 and a negative peak detector circuit 16, which function to detect or follow the positive and negative peaks, respectively, of the variations in the sensed motor current. The actual circuitry and operation of these peak detector circuits 15 and 16 will be described in more detail below with reference to FIG. 5. The function of the peak detector circuits within the system of FIG. 1 can be understood by referring to FIGS. 2(a) and 2(b).

Figure 2:
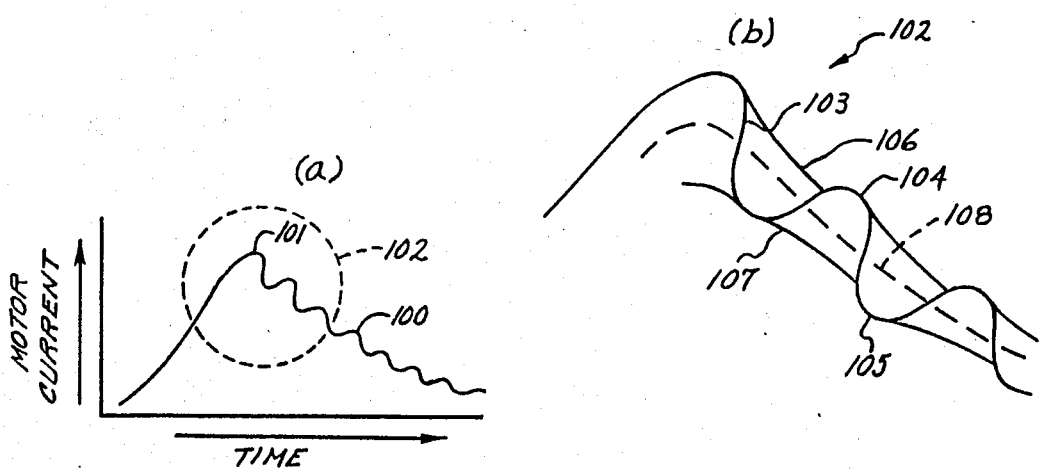
FIG. 2(a) is a graphical representation illustrating the action of the peak detector circuits of FIG. 1 in tracking the signal fed to them.
FIG. 2(b) is an enlarged view of a portion of the graphical representation of FIG. 2(a)

In FIG. 2(a), there is shown the idealized response of the commutation current from the motor with respect to time. The sensed current waveform 100 reaches a peak 101 when the motor is started and then the current starts decaying while oscillating at gradually decreasing positive and negative peaks.

FIG. 2(b) is an enlarged view of the section 102 of FIG. 2(a). It clearly shows the commutation current response 102 in which the current 103 has begun to decay in the form of pulses represented by the gradually decreasing positive peaks 104 and negative peaks 105. The positive peaks 104 are followed by the positive peak detector in the manner represented by the path 106, and the negative peaks 105 are followed by the negative peak detector as shown by the path 107. The outputs of the peak detector circuits follow the current waveform closely enough that the current crosses the average value 108 of the peak detectors for each commutation pulse, and hence the combination of the outputs of the peak detector circuits, when compared to the filtered current waveform 103 produces pulses at the output in a reliable manner.

Returning now to FIG. 1, the peak detector circuits 15 and 16 follow the peaks of the filtered motor current, and their outputs are averaged to form the reference input for the average cross detector/comparator 17. The filtered motor current waveform is passed to the other input of the comparator 17 to generate an output in the form of a pulsating square wave representing the number of pulses tracked by the detectors. The output of the detector/comparator 17 is passed through a buffer amplifier 18, which translates the pulse waveform voltages to levels digitally compatible with a standard pulse counter which counts the tracked pulses and gives the necessary indication of the count.

In FIG. 1 the output of the lowpass filter is also applied to a motor protection circuit 19 which monitors the level of the sensed motor current and prevents burnout of motor windings by generating an appropriate overload control signal if the motor current exceeds a predetermined maximum value.

Figure 3:
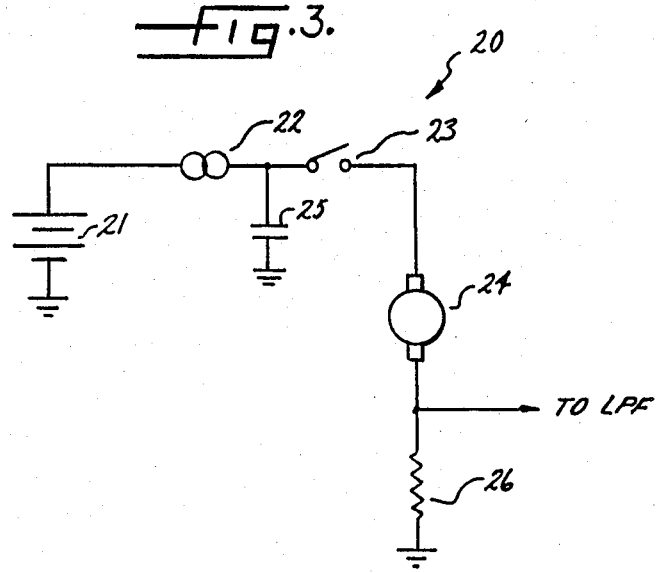
FIG. 3 is the circuit diagram of the motor supply and motor current sensing section of the pulse extraction system according to the present invention.

FIG. 3 is a circuit diagram for the motor supply and current sensing portion of the pulse extraction system according to the embodiment of FIG. 1.

The circuit 20 has a fixed d-c voltage source 21 connected in series with a current limiter 22 and a standard switch 23 for supplying power to a positioning motor 24. A capacitance 25 with a reasonably large value connects the junction of the current limiter 22 and the switch 23 to ground, and bypasses the current limiter to provide a return path for current pulses during the time that the motor is starting up and the current limiter is in action. A resistance 26 is connected between the output of the motor 24 and ground and functions as a sensing means for the current in the motor. The resistance 26 is chosen to be of a sufficiently low value that it forms a low impedance current sensing source and provides relatively high noise immunity. The sensed motor current, along with associated noise, is available to be fed to the lowpass filter section of FIG. 1.

Figure 4:
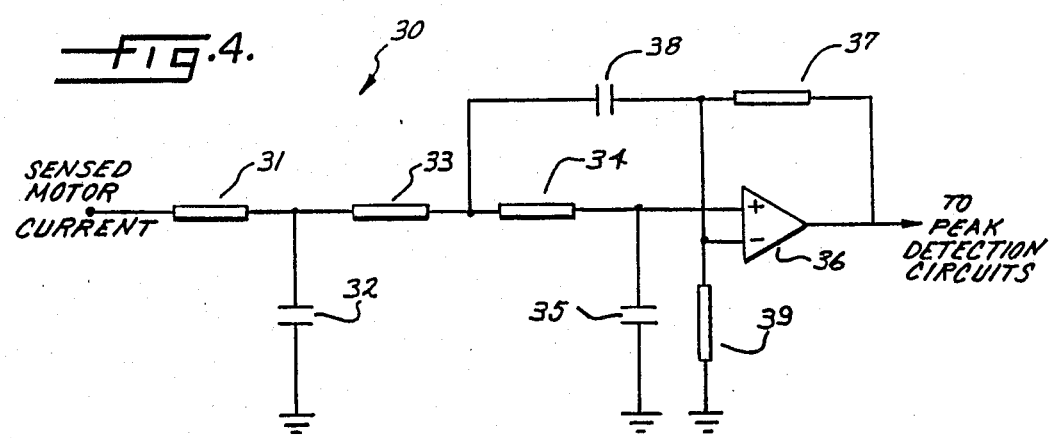
FIG. 4 is the schematic diagram of an active lowpass filter for use with the illustrative embodiment of FIG. 1.

FIG. 4 shows the schematic diagram of an active lowpass filter which may be used with the illustrative embodiment of FIG. 1.

The filter 30 is a simplified version of a third order Butterworth lowpass filter. The filter 30 may be interpreted as the combination of a passive single order lowpass filter comprised by a resistance 31 and a capacitance 32 cascaded with a second order active lowpass filter with positive feedback. The second order filter consists of an input resistance 33, an R-C network formed by a resistance 34 and a capacitance 35 connected as shown to the positive input of an operational amplifier 36. A positive feedback loop for the operation amplifier includes a resistance 37 and a capacitance 38 and connects the amplifier output back to the R-C network, specifically to the junction of resistances 33 and 34. A part of the feedback loop, specifically the junction of resistance 37 and the capacitance 38, is also connected to the negative input of the operational amplifier 36 and subsequently to ground through a resistance 39. The above arrangement ensures frequency-stabilized operation of the filter with a reasonably good square-wave response.

The amplitude-frequency response of the filter described above is sufficiently sharp for most applications of this invention, but if needed, variations of the filter using Chebyshev approximations may also be used. The design parameters of such active lowpass filters are well known in the art and do not require an elaborate description. As mentioned above, the active lowpass filter 30 accepts the sensed current signal from the positioning motor of FIG. 1, blocks out the high frequency components in which most of the noise resides, and allows only the commutation current variations to flow through to the peak detection circuits.

Figure 5:
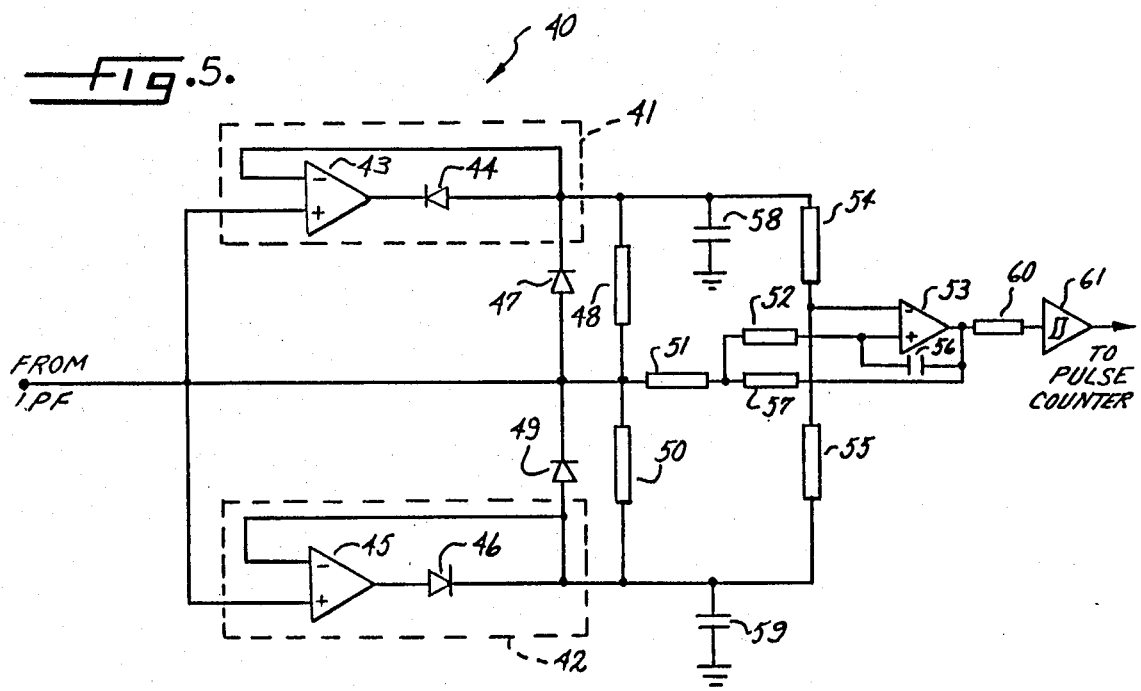
FIG. 5 is the schematic diagram of the pulse tracking section of the illustrative system, including the peak detector circuits.

Referring now to FIG. 5, there is shown a schematic diagram of the pulse detection section including the peak detector circuits of the illustrative embodiment of FIG. 1.

The pulse detection section 40 consists of a negative peak detector circuit 41 which functions to detect and follow the negative peaks of the motor current and a positive peak detector circuit 42 which functions to detect and follow the positive peaks of the motor current. The negative peak detector 41 consists of an operational amplifier 43 with a diode 44 serially connected at its output. The anode end of the diode 44 is connected back to the negative input of the amplifier to form a direct negative feedback path. The positive peak detector 42 consists of an operational amplifier 45 with a diode 46 serially connected at its output. The cathode end of the diode 46 is connected back to the negative input of the amplifier to form a direct negative feedback path.

The output of the lowpass filter is supplied to the positive input of the operational amplifier 43 of the negative peak detector 41 and to the positive input of the operational amplifier 45 of the positive peak detector 42. A parallel connection of a diode 47 and a resistance 48 connects the output of the negative peak detector 41 to the lowpass filter output, while a parallel connection of a diode 49 and a resistance 50 connects the output of the positive peak detector 42 to the lowpass filter output.

The output of the lowpass filter is also applied through a series connection of resistances 51 and 52 to the positive input of an operational amplifier 53. The negative input of the amplifier 53 is supplied by the combination of the output of the negative peak detector 41 through a resistance 54 and the output of the positive detector 42 through a resistance 55. A capacitance 56 connects the output of the amplifier 53 to its positive input, thereby forming a capacitive positive feedback path around the operational amplifier 53 and causing it to act as a comparator and hence contributing to faster, cleaner switching.

A resistance 57 connects the output of the amplifier 53 to the junction of the resistance 51 and 52. This forms a resistive positive feedback path around the amplifier 53 and introduces an easily adjustable amount of hysterysis into the circuit thereby providing noise immunity without affecting the operation of the peak detectors. The resistance 52 which feeds the positive input of the amplifier 53 serves to balance the input offset voltage created at the inputs of the amplifier 53 due to the flow of input currents of the amplifiers 43, 45 and 53 through the resistances 48, 50, 51, 54, 55 and 57, and increases the overall sensitivity of the system.

Peak storage capacitors 58 and 59 are connected between the outputs of the negative peak detector 41 and positive peak detector 42, respectively, and the ground. The output of the amplifier 53 is supplied through a current limiting resistance 60 to an amplifier 61 which is a standard CMOS Schmitt trigger performing as a limiter to translate the output voltage levels of amplifier 53 to levels compatible with conventional TTL/CMOS digital circuitry.

The circuitry described above provides reliable tracking of the commutation pulses of the positioning motor during start and stop, as well as during normal running, due to its excellent transient response which is ensured by the provision of a variable decay time for each of the peak detectors, with the variation being dependent on the amplitude of the commutation pulses.

More specifically, the parallel resistances 48 and 50 cause the peak storage capacitor voltages of the peak detectors 41 and 42, respectively, to follow sudden level changes in the sensed motor current which are of polarity opposite to the polarity of peak detection and which have an amplitude less than a predefined value (typically 0.5 volts for most d-c motor applications) at a rate approximately proportional to the amplitude of the sudden level changes. And the parallel diodes 47 and 49 cause the peak storage capacitor voltages of the peak detectors 41 and 42, respectively, to rapidly follow sudden level changes in the sensed motor current of polarity opposite to the polarity of peak detection and which have an amplitude greater than the predefined value mentioned above. In effect, depending on the instantaneous amplitude of the commutation pulses, a variable decay time is provided for the peak detectors.

Since the combined input of the positive and negative peak detectors is fed along with the lowpass filter output to the output amplifier 52, the output of the above circuit represents a square wave with a pulse for each time the commutation pulses cross the average value of the two peak detectors. The output is hence an accurate measure of the number of commutation pulses actually produced, and is fed to conventional pulse-counting means to obtain a numerical indication of the pulse count.

The pulse counting system described above provides a relatively high degree of resolution in tracking the pulse count. Conventional methods, using Hall Effect switches or similar devices, typically provide a single pulse for every 10 revolutions of the positioning motor because of the gearing arrangement of the linear drive to which the position sensors are connected. Because the system according to the present invention uses the commutation pulses produced within the motor itself as a reference means, one revolution of the motor corresponds typically to 10 pulses (for 5-segment commutator motors), and hence the overall resolution is improved typically by a factor of 50 to 100. In other words, the illustrative system can miss counting a few commutation pulses and yet maintain a high degree of accuracy on the count of motor revolutions.

Figure 6:
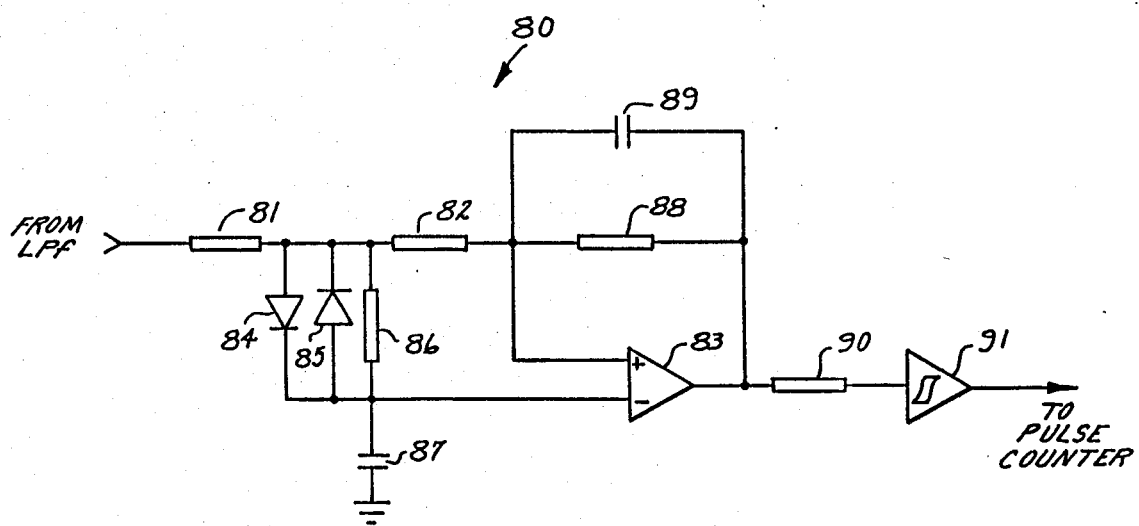
FIG. 6 is the schematic diagram of an alternative embodiment of the pulse tracking section for use with the system of this invention.

FIG. 6 shows a schematic diagram of an alternative embodiment of the pulse tracking section for use with the system of the invention.

The alternative embodiment 80 responds to a more limited range of frequencies and sudden level changes in sensed current as compared to the illustrative embodiment of FIG. 5. But it has the advantage of being significantly simplier as it dispenses with the need for the separate peak detector circuits. Instead of the peak detectors, an operational amplifier is operated in a slope detector/comparator mode so that it switches whenever the slope of the input waveform changes direction and exceeds a predefined minimum slope threshold. This slope threshold is conveniently controlled by the ratio of a pair of resistances in the feedback path of the operational amplifier.

As shown in FIG. 6, the pulse tracking section 80 accepts the output of the low-pass filter discussed above with reference to FIG. 4 and feeds it through a serial connection of two resistances 81 and 82 to the positive input of an operational amplifier 83. A pair of diodes 84 and 85 are connected as shown between the junction of the serial resistances 81, 82 and the negative input of the operational amplifier 83. Also connected across the same points is a resistance 86 which has its end on the amplifier side connected to ground through a capacitance 87. A positive feedback path is formed around the amplifier 83 by a parallel connection of a resistance 88 and a capacitance 89 between the amplifier output and its positive input. The output of the operational amplifier 83 is fed through a resistance 90 to a limiting amplifier 91.

Instead of the peak detectors or average cross detectors used by the earlier embodiment discussed above, the circuit of FIG. 6 is designed so that the operational amplifier 72 functions as a slope detector/comparator. It tracks the pulsating motor current by effectively switching whenever the slope of the output of the lowpass filter changes direction and exceeds a predefined threshold of minimum slope $\Delta V/\Delta T$. This slope threshold is set by the hysterysis level of the operational amplifier 76 and by the time constant of the R-C network formed by the resistance 86 and the capacitance 87. The hysterysis level of the amplifier is in turn defined and conveniently controlled by the ratio of the serially connected resistances 82 and 88. As in the case of the embodiment discussed above, the diodes 84 and 85 function to cause the system to respond to large and sudden level changes in the sensed signal from the motor.

The limiting amplifier 91 is a standard CMOS Schmitt trigger and performs as a limiter in translating the output voltage levels of the amplifier 83 to levels compatible with conventional TTL/CMOS digital circuitry. The resistance 90 functions to protect the inputs of the amplifier 91 by limiting the current surges that might flow through in case of an overdrive condition occurring at the drive motor.

Figure 7:
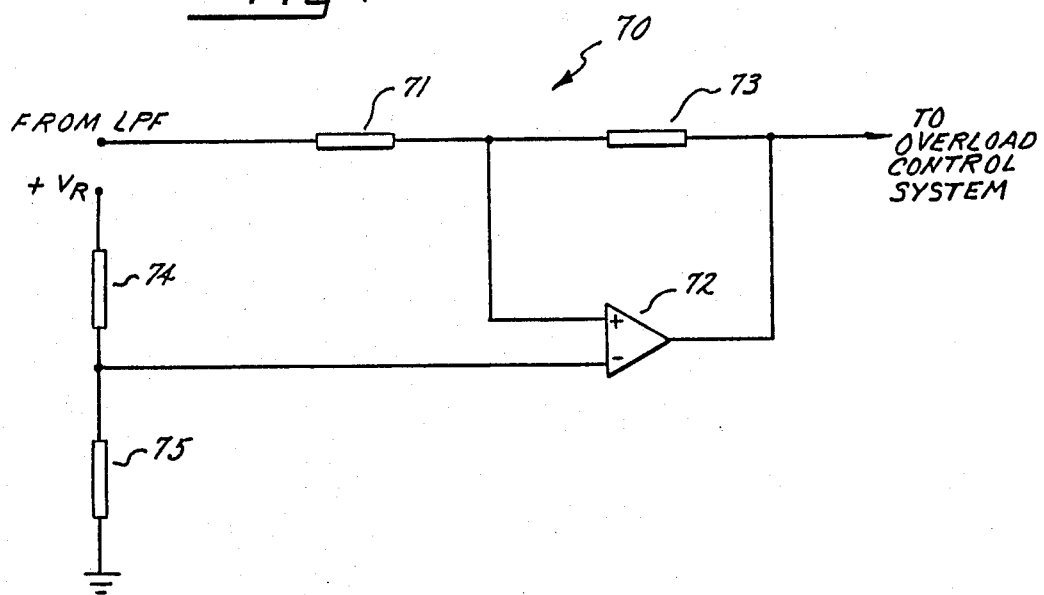
FIG. 7 is the circuit diagram of the motor overload indication section of the illustrative embodiment of FIG. 1.

FIG. 7 is a circuit diagram of a motor overload indication circuit 70 for use with the illustrative embodiment of FIG. 1. As shown, the filtered commutation current from the lowpass filter of FIG. 1 is supplied through a resistance 71 to the positive input of an operational amplifier 72. A resistive positive feedback path is formed by a resistance 73 which connects the amplifier output back to the positive input and provides a small amount of hysteresis. A reference voltage $V_R$ is supplied through a voltage divider formed by resistances 74 and 75 to the negative input of the operational amplifier 72. The above circuit acts as a comparator and produces an overload control signal at its output whenever the sensed motor current is found to exceed a predefined maximum value, as determined by the voltage divider. This overload signal is used to take appropriate control action, such as stopping the positioning motor, until the overload condition subsides.

We claim:

1. A motor pulse extraction system for measuring the rotational motion of an electric motor, said system comprising:
    a fixed voltage source supplying said motor,
    means for sensing the variations in the form of pulses in the current within said motor due to the pulses resulting from the commutation undergone by said motor;
    filtering means capable of suppressing the high frequency noise produced within said motor during commutation and allowing only said pulses in motor current to pass through,
    peak following circuitry including a positive peak detector for following the positive peaks of said current pulses and a negative peak detector for following the negative peaks of said current pulses, said peak following circuitry producing at its output a waveform consisting of rectangular pulses proportional to the number of said motor current pulses detected by said peak detectors, and
    means for counting said rectangular pulses and generating an indication of the number of said motor current pulses.

2. The motor pulse extraction system of claim 1 wherein said fixed voltage source supplies said motor through a current limiting circuit including an electrical switch and said motor has its supply end bypassed from said current limiting means by capacitance means.

3. The motor pulse extraction system of claim 2 wherein said sensing means includes a low value resistance constituting a low impedance means for sensing said current pulse variations within said motor.

4. The motor pulse extraction system according to claim 3 wherein said filtering means is an active lowpass filter operative to suppress said high frequency noise produced during commutation of said motor and to allow only said current pulse variations to pass through.

5. The motor pulse extraction system of claim 4 wherein said active lowpass filter is the combination of a passive lowpass filter comprising a resistance and a capacitance cascaded with an active lowpass filter with positive feedback, said active lowpass filter comprising an input resistance, an R-C network formed by a resistance and a capacitance connected to the positive input of an operational amplifier, said amplifier having a positive feedback path including a resistance and a capacitance connecting the amplifier output to said R-C network, with a portion of said feedback path being connected to the negative input of said amplifier and a grounding resistance.

6. The motor pulse extraction system of claim 5 wherein said peak following circuitry includes:
    a negative peak detector consisting of an operational amplifier with a diode serially connected at the amplifier output and the anode end of said diode being connected to the negative input of said amplifier to form a direct negative feedback path, and
    a positive peak detector consisting of an operational amplifier with a diode serially connected at the amplifier output and the cathode end of said diode being connected to the negative input of said amplifier to form a direct negative feedback path,
    and said peak following circuitry has the output of said lowpass filter supplied to the positive input of said operational amplifier within said positive peak detector and to the positive input of said operational amplifier within said negative peak detector.

7. The pulse extraction system of claim 6 wherein said peak following circuitry is further characterized by a first parallel connection of a diode and a resistance which connects the output of said positive detector circuit to the output of said lowpass filter and a second parallel connection of a diode and a resistance which connects the output of said negative detector circuit to the output of said lowpass filter.

8. The pulse extraction system of claim 7 wherein said peak following circuitry also has:
    the output of said lowpass filter applied through a pair of serially connected resistances to the positive input of an average cross-detecting amplifier, said amplifier having its negative input connected to the output of said positive peak detector through a first resistance and to the output of said negative peak detector circuit through a second resistance and receiving the average value of said positive and negative peaks followed by said peak detectors, said average cross-detecting amplifier also having its output connected through a capacitance to its positive input, thereby forming a positive capacitive feedback path which makes said amplifier switch faster, said output of said amplifier also being connected through a resistance to the junction of said serially connected pair of resistances thereby forming a resistive feedback path around said amplifier.

9. The pulse extraction system of claim 8 which includes a limiting amplifier receiving the output of said average cross-detecting amplifier through a current limiting resistance.

10. The pulse extraction system of claim 9 wherein the filtered motor current signal from said lowpass filter is also supplied to an overload protection circuit operative to generate an overload indication signal at its output if said motor current signal exceeds a predefined maximum value.

11. The pulse extraction system of claim 10 wherein said overload protection circuit comprises an operational amplifier with its positive input supplied by said output of lowpass filter through a resistance and its negative input supplied by a reference voltage through a voltage divider consisting of a pair of series resistances, said amplifier having its output connected to its positive input through a resistance to form a positive resistance feedback path, and said amplifier compares said accepted lowpass filter output to said reference voltage to generate an overload indication signal at its output whenever said motor current signal exceeds a predefined maximum value.

12. A method for measuring the rotational motion of an electric motor by extracting and counting the variations in the form of pulses produced in the current within said motor as a result of pulses generated by the commutation of said motor during its operation, said method comprising the steps of:

supplying said motor with a fixed voltage source and sensing said pulses within said motor current, filtering said sensed current in a way that suppresses any high frequency noise produced within said motor during its commutation and allows only said pulses in motor current to pass through, processing said filtered motor current pulses by separately detecting and following their positive and negative peaks to generate an output wave pulsating at a frequency that is proportional to the number of said motor current pulses detected and followed, and counting said pulses in said output wave to generate an indication of the number of said motor current pulses.

13. The method as set forth in claim 12 wherein said fixed voltage is supplied to said motor through a current limiting circuit, said limiting circuit being bypassed from said motor by capacitance means.

14. The method of claim 13 wherein said current pulse variations within said motor are sensed through a low impedance means connected to the output of said motor.

15. The method as set forth in claim 14 wherein said filtering is performed by using an active lowpass filter operative to suppress said high frequency noise produced during commutation of said motor and to allow only said current pulse variations to pass through.

16. The method as set forth in claim 15 wherein said processing of said filtered motor current pulses includes the use of a positive peak detector circuit for following the positive peaks of said current pulses and a negative peak detector circuit for following the negative peaks of said current pulses, with the outputs of said positive and negative peak detectors being combined in such a way with said filtered motor circuit variations as to generate a pulsating output wave with pulses that correspond to the number of said motor current pulses detected by said peak detector circuits.

17. A motor pulse extraction system for measuring the rotational motion of an electric motor, said system comprising:

a fixed voltage source supplying said motor, means for sensing the variations in the form of pulses in the current within said motor due to the pulses resulting from the commutation undergone by said motor, filtering means capable of suppressing the high frequency noise produced within said motor during commutation and allowing only said pulses in motor current to pass through, pulse tracking circuitry including an operational amplifier which switches whenever the slope of the input waveform changes direction and exceeds a predefined threshold value to produce at its output a waveform consisting of rectangular pulses proportional to the number of said sensed motor current pulses, and means for counting said rectangular pulses and generating an indication of the number of said motor current pulses.

18. The motor pulse extraction system of claim 17 wherein said fixed voltage source supplies said motor through a current limiting circuit including an electrical switch and said motor has its supply end bypassed from said current limiting means by capacitance means.

19. The motor pulse extraction system of claim 18 wherein said sensing means includes a low value resistance constituting a low impedance means for sensing said current pulse variations within said motor.

20. The motor pulse extraction system according to claim 19 wherein said filtering means is an active lowpass filter operative to suppress said high frequency noise produced during commutation of said motor and to allow only said current pulse variations to pass through.

21. The motor pulse extraction system of claim 20 wherein said active lowpass filter is the combination of a passive lowpass filter comprising a resistance and a capacitance cascaded with an active lowpass filter with positive feedback, said active lowpass filter comprising an input resistance, an R-C network formed by a resistance and a capacitance connected to the positive input of an operational amplifier, said amplifier having a positive feedback path including a resistance and a capacitance connecting the amplifier output to said R-C network, with a portion of said feedback path being connected to the negative input of said amplifier and a grounding resistance.

22. The motor pulse extraction system of claim 21 wherein said pulse tracking circuitry has the output of said lowpass filter fed to the positive input of said operational amplifier through a serial connection of a pair of resistances, the negative input of said amplifier is connected to the junction of said serial resistances through a parallel connection of a pair of diodes and a resistance and to ground through a capacitance, and the output of said amplifier is fed back to its positive input through a parallel connection of a resistance and a capacitance, and the output of said amplifier is also fed to a limiting amplifier through a current limiting resistance.

* * * * *